(12) United States Patent
Rencher et al.

(10) Patent No.: US 9,881,507 B2
(45) Date of Patent: Jan. 30, 2018

(54) TURBULENCE DETECTION AND MONITORING

(71) Applicant: The Boeing Company, Chicago, IL (US)

(72) Inventors: Robert J. Rencher, Normandy Park, WA (US); Joey Carlson, Denver, CO (US); David M. Yager, Renton, WA (US); Tam M. Vu, Seattle, WA (US)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 14/535,250

(22) Filed: Nov. 6, 2014

(65) Prior Publication Data

US 2016/0133137 A1 May 12, 2016

(51) Int. Cl.
*G08G 5/00* (2006.01)
*G01W 1/00* (2006.01)
*G01C 23/00* (2006.01)

(52) U.S. Cl.
CPC .......... *G08G 5/0091* (2013.01); *G01C 23/00* (2013.01); *G01W 1/00* (2013.01); *G08G 5/0013* (2013.01); *G08G 5/0021* (2013.01); *G08G 5/0052* (2013.01); *G01W 2001/003* (2013.01)

(58) Field of Classification Search
None
See application file for complete search history.

(56) References Cited

U.S. PATENT DOCUMENTS

| 5,541,591 A | 7/1996 | Bush |
| 6,189,836 B1* | 2/2001 | Gold .................... G05D 1/0816 244/17.13 |
| 7,598,901 B2 | 10/2009 | Tillotson et al. |
| 7,889,328 B2* | 2/2011 | Tillotson .................. G01P 5/26 356/28 |
| 8,130,121 B2 | 3/2012 | Smith et al. |
| 8,825,234 B2 | 9/2014 | Williams et al. |
| 2009/0088922 A1* | 4/2009 | Mesec .................. B64C 27/008 702/58 |
| 2011/0257818 A1* | 10/2011 | Ganz ....................... G01W 1/00 701/14 |

OTHER PUBLICATIONS

Kapoor, Ashish, et al., "Airplanes Aloft as a Sensor Network for Wind Forecasting", Microsoft Research, 2014, 9 pages.
Microsoft Research, "AI Takes to the Skies", Jun. 3, 2014, retrieved from Internet on Oct. 27, 2014 at URL: http://research.microsoft.com/en-us/news/features/windflow-060314.aspx, 4 pages.
Microsoft Research, "Winds Alofts by Windflow at 39000 feet", Oct. 21, 2014, retrieved from Internet on Oct. 27, 2014 at URL: http://windflow.azurewebsites.net/, 1 page.

* cited by examiner

*Primary Examiner* — Shelley Chen
(74) *Attorney, Agent, or Firm* — Kolisch Hartwell, P.C.

(57) ABSTRACT

A turbulence detection and monitoring system may include a data processing system configured to collect and analyze motion-related sensor data from a plurality of personal electronic devices onboard an aircraft in flight. The personal electronic devices may communicate with the data processing system at least in part via an onboard wireless network.

17 Claims, 4 Drawing Sheets

TURBULENCE DETECTION AND MONITORING

CROSS-REFERENCES

The following related applications and materials are incorporated herein, in their entireties, for all purposes: U.S. Pat. Nos. 7,598,901 and 8,130,121.

FIELD

This disclosure relates to systems and methods for detecting and monitoring atmospheric turbulence, and displaying turbulence information.

INTRODUCTION

Atmospheric stability may vary in the air at altitudes used by commercial and other aircraft. When an aircraft flies in unstable air, the aircraft may encounter turbulence, and the aircraft may move erratically. The erratic movement of the aircraft may cause shifting of items, passengers, and crew members within the aircraft. Pilots typically avoid turbulent areas when possible. Pilots rely on many sources of information to avoid turbulence. These sources of information include, for example, weather forecasts and pilot reports (PIREPs). A pilot report is a single report of actual weather conditions encountered by an aircraft in flight. This type of information is transmitted by a pilot through voice or data link means to a ground station. This information may then be collected, stored, and then communicated by various air traffic control services, weather providers, or flight dispatch departments to other aircraft in flight. When a pilot in an aircraft receives a pilot report of turbulence, the pilot may then determine whether the aircraft might encounter the reported turbulence. Further, with this information, the pilot can take action to mitigate or avoid the turbulence. The pilot may secure the passengers and flight attendants in the passenger cabin, or may change altitude or route in an effort to avoid the turbulence. Clear-air turbulence is virtually impossible to detect visually or even using conventional radars. Passengers typically must rely on notification from the pilot regarding upcoming turbulence, and the pilot typically must rely on anecdotal reports from other pilots.

SUMMARY

The present disclosure provides a system for monitoring atmospheric turbulence, the system comprising a data processing system in operative communication with a wireless network onboard an aircraft, the data processing system being configured to receive motion data from a plurality of personal electronic devices onboard the aircraft, each device of the plurality of personal electronic devices in operative communication with the wireless network onboard the aircraft and each device of the plurality of personal electronic devices including a motion sensor configured to sense motion of the respective electronic device; wherein the motion data corresponds to sensed motion over time for each device of the plurality of personal electronic devices, and wherein the data processing system is further configured to identify an atmospheric turbulence event by analyzing the motion data received from the plurality of electronic devices.

In some embodiments, a method for monitoring air turbulence may include receiving motion-related data from a plurality of personal electronic devices onboard an aircraft in flight, each of the personal electronic devices including a respective motion sensor; analyzing the motion-related data to determine a motion event common to the plurality of personal electronic devices; and correlating the motion event with a location of the aircraft.

In some embodiments, a method for monitoring turbulence may include collecting accelerometer data from a plurality of smartdevices onboard an aircraft in flight; filtering the accelerometer data to identify turbulence events encountered by the aircraft; and generating a map of the turbulence events based on geographical location and/or altitude.

Features, functions, and advantages may be achieved independently in various embodiments of the present disclosure, or may be combined in yet other embodiments, further details of which can be seen with reference to the following description and drawings.

DESCRIPTION

Overview

Various embodiments of a turbulence detection and monitoring system, including related methods, are described below and illustrated in the associated drawings. Unless otherwise specified, a turbulence detection and monitoring system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other turbulence-related systems and methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

A turbulence detection and monitoring system may include a data processing system that receives motion-related data from one or more personal electronic devices (e.g., smartphones, tablets, wearable computing devices, etc.) that are located onboard an aircraft in flight. Such motion-related data is available from personal electronic devices that have embedded sensors capable of detecting one or more aspects of motion. For example, a smartphone will typically include at least one accelerometer configured to sense acceleration of the device, e.g., on three axes. Data from these sensors corresponds to motion of the respective devices, and accordingly corresponds (at least in part) to motion of the aircraft.

Analysis of the motion-related data received from such devices may facilitate detection and monitoring of motion-related aircraft events (e.g., turbulence). Analysis may include filtering to remove idiosyncratic motion data peculiar to individual devices. For example, a user may stand, sit, and move around the cabin of the aircraft with a device such as a smartphone. Data relating to this motion will be peculiar to the device in question. On the other hand, motion substantially shared by (i.e., common to) all devices on the aircraft may be assumed to be caused by movement of the aircraft rather than all users acting in concert. Turbulence and/or other motion-related events may be detected as coincidental device motion above a predetermined threshold or significantly departing from movement expected due to airplane course and speed.

Accordingly, the data processing system may identify motion-related events. Identifying a motion-related event may include determining characteristics of the event, such as amplitude, severity, frequency, direction, subjective description, and/or the like, or any combination of these. Correlating each event with known airplane position and altitude may allow mapping of the motion-related events. For example, a map of turbulence may be generated. Mapping may include both geographical location and altitude of the events. This turbulence map may be updated continuously or periodically, as data is received and/or analyzed. Data may be received from multiple devices onboard multiple aircraft following multiple routes. Data may be received real-time, near real-time, periodically, and/or on a delayed basis. Some or all of the motion-related events may be mapped and/or updated.

Processed data may be provided to users. For example, a map of turbulence and/or related data may be provided to airlines, pilots, passengers, and/or meteorologists. In some examples, a map of turbulence may be provided to users' personal electronic devices via a network including the Internet and/or a wireless network onboard one or more aircraft. Accordingly, motion-related data may be both received from and provided to the personal electronic devices onboard aircraft. Collection and distribution of such information may be facilitated by a software application installed and/or executed on each respective personal electronic device.

Aspects of a turbulence detection and monitoring system may be embodied as a computer method, computer system, or computer program product. Accordingly, aspects of the turbulence detection and monitoring system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the turbulence detection and monitoring system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the turbulence detection and monitoring system may be written in one or any combination of programming languages, including an object-oriented programming language such as Java, Smalltalk, or C++, conventional procedural programming languages, such as the C programming language, and a mobile programming language such as Objective C and/or C#. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of a turbulence detection and monitoring system are described below with reference to flowchart illustrations and/or block diagrams of methods, apparatuses, systems, and/or computer program products according to aspects of the present disclosure. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Definitions

"Turbulence" may refer to the random and/or chaotic motion of air caused by changes in air currents. Alternatively or additionally, turbulence may refer to an atmospheric flow condition in which local speed and pressure change unpredictably as an average flow is maintained. Some characteristics of turbulence may include eddies, vortices, and/or a change in drag on an aircraft in flight. As used herein, turbulence may include one or more aspects of clear-air turbulence (CAT).

EXAMPLES, COMPONENTS, AND ALTERNATIVES

The following examples describe selected aspects of exemplary turbulence detection and monitoring systems as well as related methods. These examples are intended for illustration and should not be interpreted as limiting the entire scope of the present disclosure. Each example may include one or more distinct inventions, and/or contextual or related information, function, and/or structure.

Example 1

Figure 1:
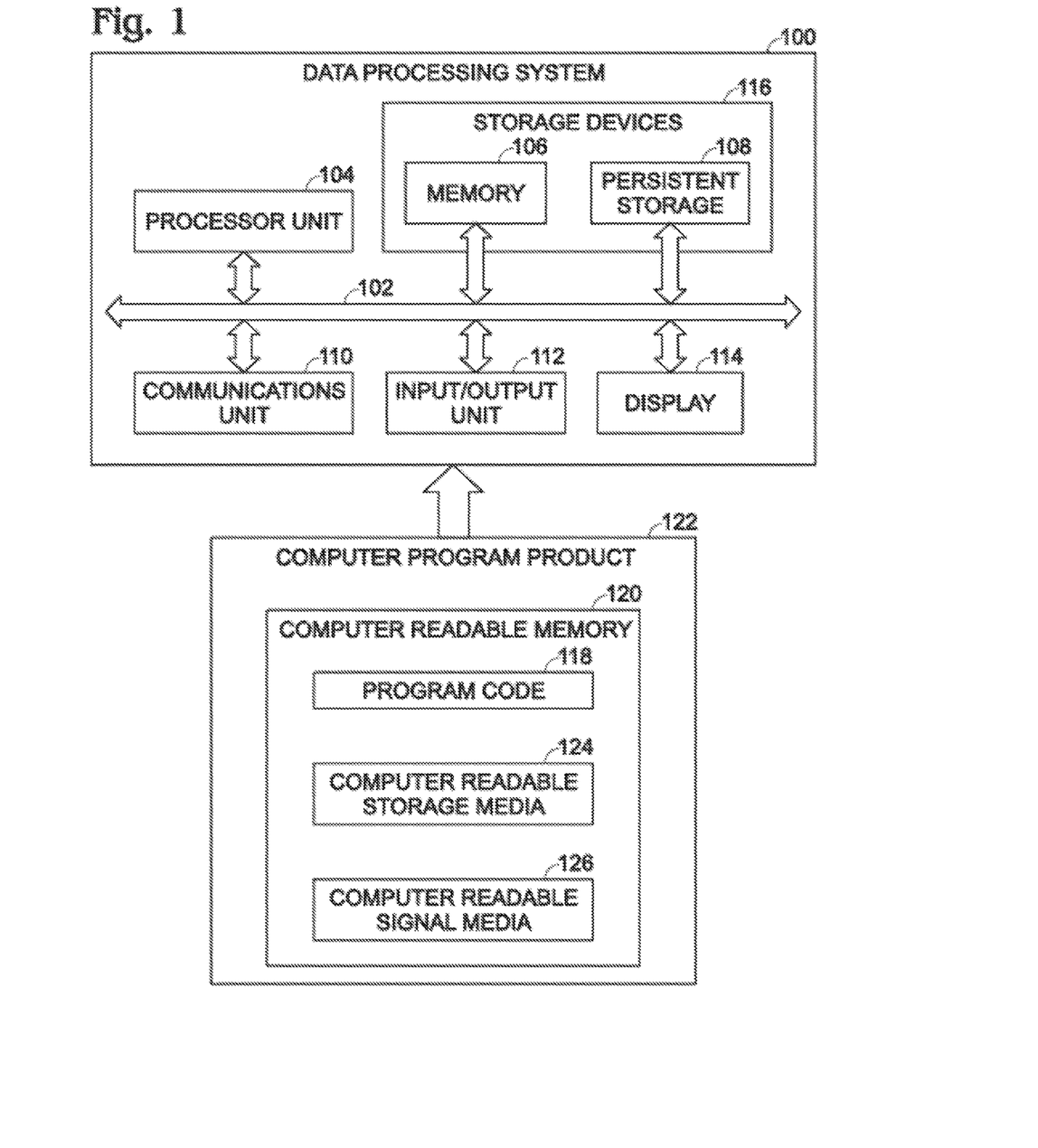
FIG. 1 is a schematic diagram of various components of an illustrative data processing system.

As shown in FIG. 1, this example describes a data processing system 100 in accordance with aspects of the present disclosure. In this example, data processing system 100 is an illustrative data processing system suitable for implementing aspects of a turbulence detection and monitoring system. More specifically, in some examples, motion-related data may be collected from devices that are embodiments of data processing systems (e.g., smartphones, tablets). In some examples, motion-related data may be received and/or processed by devices and systems that include embodiments of data processing systems (e.g., servers, personal computers, arrays of computing devices, and/or the like).

In this illustrative example, data processing system 100 includes communications framework 102. Communications framework 102 provides communications among processor unit 104, memory 106, persistent storage 108, communications unit 110, input/output (I/O) unit 112, and display 114. Memory 106, persistent storage 108, communications unit 110, input/output (I/O) unit 112, and display 114 are examples of resources accessible by processor unit 104 via communications framework 102.

Processor unit 104 serves to run instructions that may be loaded into memory 106. Processor unit 104 may be a number of processors, a multi-processor core, or some other type of processor, depending on the particular implementation. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and other suitable information either on a temporary basis or a permanent basis.

Storage devices 116 also may be referred to as computer-readable storage devices in these examples. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output (I/O) unit 112 allows for input and output of data with other devices that may be connected to data processing system 100. For example, input/output (I/O) unit 112 may provide a connection for user input through a keyboard, a mouse, a touchscreen, voice recognition, and/or some other suitable input device. Further, input/output (I/O) unit 112 may send output to a printer. Display 114 provides a mechanism to display information to a user.

Instructions for the operating system, applications, and/or programs may be located in storage devices 116, which are in communication with processor unit 104 through communications framework 102. In these illustrative examples, the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program instructions, program code, computer usable program code, or computer-readable program code that may be read and executed by a processor in processor unit 104. The program code in the different embodiments may be embodied on different physical or computer-readable storage media, such as memory 106 or persistent storage 108.

Program code 118 is located in a functional form on computer-readable media 120 that is selectively removable and may be loaded onto or transferred to data processing system 100 for execution by processor unit 104. Program code 118 and computer-readable media 120 form computer program product 122 in these examples. In one example, computer-readable media 120 may be computer-readable storage media 124 or computer-readable signal media 126.

Computer-readable storage media 124 may include, for example, an optical or magnetic disk that is inserted or placed into a drive or other device that is part of persistent storage 108 for transfer onto a storage device, such as a hard drive, that is part of persistent storage 108. Computer-readable storage media 124 also may take the form of a persistent storage, such as a hard drive, a thumb drive, or a flash memory, that is connected to data processing system 100. In some instances, computer-readable storage media 124 may not be removable from data processing system 100.

In these examples, computer-readable storage media 124 is a physical or tangible storage device used to store program code 118 rather than a medium that propagates or transmits program code 118. Computer-readable storage media 124 is also referred to as a computer-readable tangible storage device or a computer-readable physical storage device. In other words, computer-readable storage media 124 is a media that can be touched by a person.

Alternatively, program code 118 may be transferred to data processing system 100 using computer-readable signal media 126. Computer-readable signal media 126 may be, for example, a propagated data signal containing program code 118. For example, computer-readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 118 may be downloaded over a network to persistent storage 108 from another device or data processing system through computer-readable signal media 126 for use within data processing system 100. For instance, program code stored in a computer-readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to and/or in place of those illustrated for data processing system 100. Other components shown in FIG. 1 can be varied from the illustrative examples shown. The different embodiments may be implemented using any hardware device or system capable of running program code. As one example, data processing system 100 may include organic components integrated with inorganic components and/or may be comprised entirely of organic components excluding a human being. For example, a storage device may be comprised of an organic semiconductor.

In another illustrative example, processor unit 104 may take the form of a hardware unit that has circuits that are manufactured or configured for a particular use. This type of hardware may perform operations without needing program code to be loaded into a memory from a storage device to be configured to perform the operations.

For example, when processor unit 104 takes the form of a hardware unit, processor unit 104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 118 may be omitted, because the processes for the different embodiments are implemented in a hardware unit.

In still another illustrative example, processor unit 104 may be implemented using a combination of processors found in computers and hardware units. Processor unit 104 may have a number of hardware units and a number of processors that are configured to run program code 118. With this depicted example, some of the processes may be implemented in the number of hardware units, while other processes may be implemented in the number of processors.

In another example, a bus system may be used to implement communications framework 102 and may be comprised of one or more buses, such as a system bus or an input/output bus. Of course, the bus system may be implemented using any suitable type of architecture that provides for a transfer of data between different components or devices attached to the bus system.

Additionally, communications unit 110 may include a number of devices that transmit data, receive data, or both transmit and receive data. Communications unit 110 may be, for example, a modem or a network adapter, two network adapters, or some combination thereof. Further, a memory may be, for example, memory 106, or a cache, such as that found in an interface and memory controller hub that may be present in communications framework 102.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 2

Figure 2:
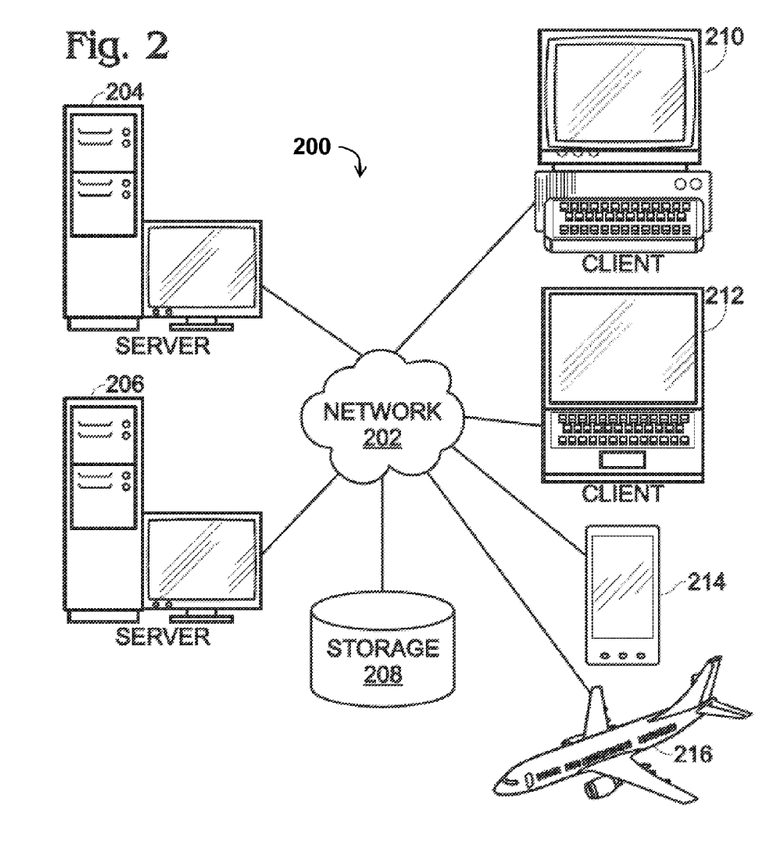
FIG. 2 is a schematic representation of an illustrative computer network system.

As shown in FIG. 2, this example describes a general network data processing system 200, interchangeably termed a network, a computer network, a network system, or a distributed network, which may be included in one or more illustrative embodiments of a turbulence detection and monitoring system. For example, personal electronic devices that provide motion-related data may communicate over one or more networks. In some examples, ground-based communication and/or analysis computers may be part of one or more networks. It should be appreciated that FIG. 2 is provided as an illustration of one implementation and is not intended to imply any limitation with regard to environments in which different embodiments may be implemented. Many modifications to the depicted environment may be made.

Network data processing system 200 is a network of computers, each of which is an example of data processing system 100, and other components. Network data processing system 200 may include network 202, which is a medium configured to provide communications links among various devices and computers connected together within network data processing system 200. Network 202 may include connections such as wired or wireless communication links, fiber optic cables, and/or any other suitable medium for transmitting and/or communicating data between network devices, or any combination thereof.

In the depicted example, a first network device 204 and a second network device 206 connect to network 202, as does an electronic storage device 208. Network devices 204 and 206 are each examples of data processing system 100, described above. In the depicted example, devices 204 and 206 are shown as server computers. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 210, a client laptop or tablet 212, and/or a client smartdevice 214, may connect to network 202. Each of these devices is an example of data processing system 100, described above regarding FIG. 1. In some examples, communications-enabled data processing systems on one or more aircraft 216 may connect to network 202. Additionally or alternatively, client electronic devices may include, for example, one or more personal computers, network computers, and/or mobile computing devices such as personal digital assistants (PDAs), smartphones, handheld gaming devices, wearable devices, and/or tablet computers, and the like. In the depicted example, server 204 may provide information, such as boot files, operating system images, and applications to one or more of the client electronic devices. Client electronic devices 210, 212, 214, and 216 may be referred to as "clients" with respect to a server such as server computer 204. Network data processing system 200 may include more or fewer servers and clients, or no servers or clients, as well as other devices not shown.

Client smartdevice 214 may include any suitable portable electronic device capable of wireless communications and execution of software, such as a smartphone or a tablet. Generally speaking, the term "smartphone" may describe any suitable portable electronic device having more advanced computing ability and network connectivity than a typical mobile phone. In addition to making phone calls (e.g., over a cellular network), smartphones may be capable of sending and receiving emails, texts, and multimedia messages, accessing the Internet, and/or functioning as a web browser. Smartdevices (e.g., smartphones) may also include features of other known electronic devices, such as a media player, personal digital assistant, digital camera, video camera, and/or global positioning system. Smartdevices (e.g., smartphones) may be capable of connecting with other smartdevices, computers, or electronic devices wirelessly, such as through near field communications (NFC), BLUETOOTH®, WiFi, or mobile broadband networks. Wireless connectively may be established among smartdevices, smartphones, computers, and other devices to form a mobile network where information can be exchanged.

Program code located in system 200 may be stored in or on a computer-recordable storage medium, such as persistent storage 108 in Example 1, and may be downloaded to a data processing system or other device for use. For example, program code may be stored on a computer-recordable storage medium on server computer 204 and downloaded for use to client 210 over network 202 for use on client 210.

Network data processing system 200 may be implemented as one or more of a number of different types of networks. For example, system 200 may include an intranet, a wireless (e.g., WiFi) network, a local area network (LAN), a wide area network (WAN), or a personal area network (PAN). Aspects of the network(s) may be wired or wireless. In some examples, network data processing system 200 includes the Internet, with network 202 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. FIG. 2 is intended as an example, and not as an architectural limitation for any illustrative embodiments.

Example 3

Figure 3:
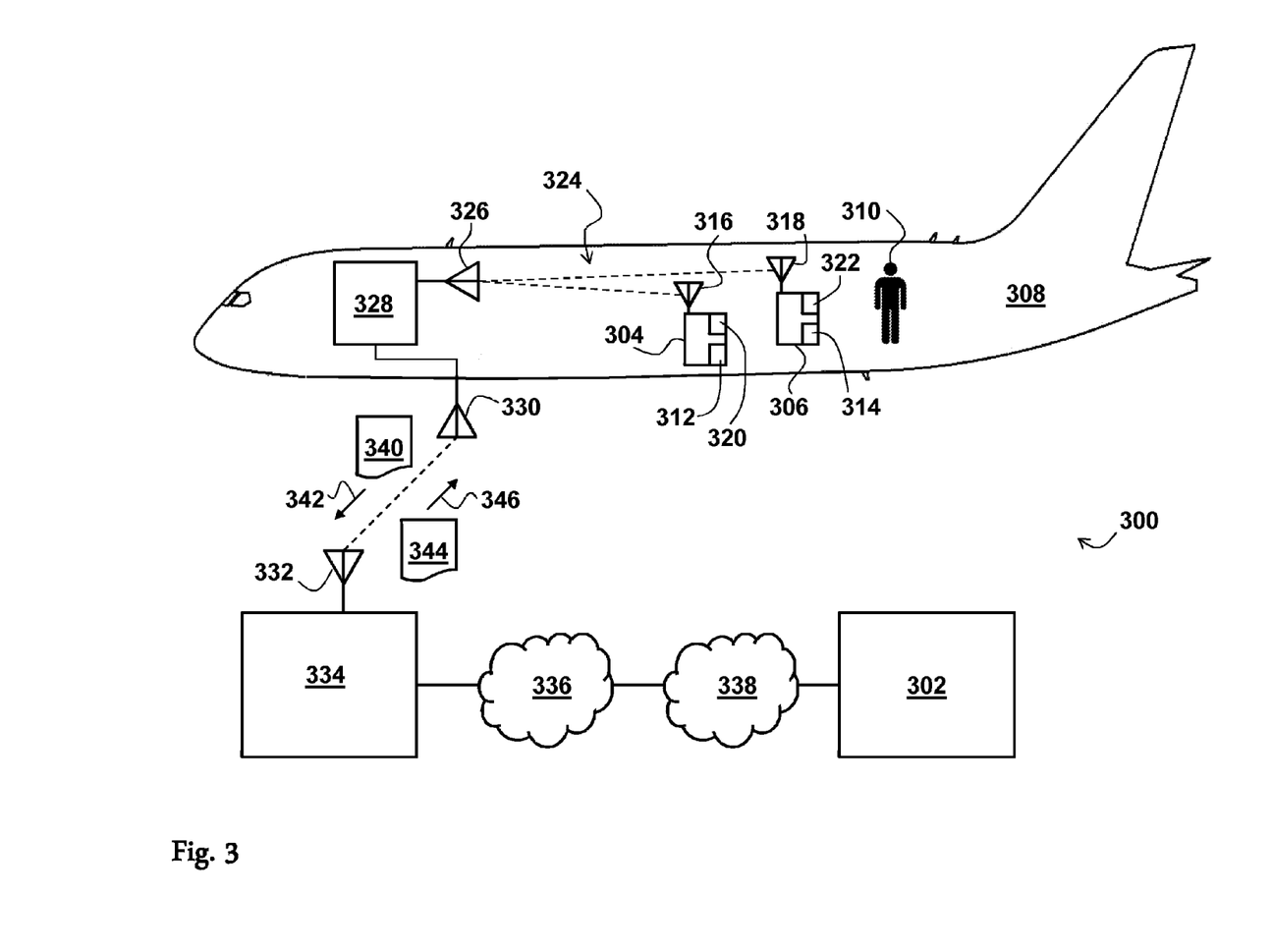
FIG. 3 is a schematic representation of an illustrative turbulence detection and monitoring system in accordance with aspects of the present disclosure.

As shown in FIG. 3, this example describes an illustrative turbulence detection and monitoring system.

FIG. 3 depicts an illustrative turbulence detection and monitoring system, generally indicated at 300. System 300 may include a data processing system 302 configured to receive motion-related information originating from a plurality of personal electronic devices 304, 306 onboard an aircraft 308. Data processing system 302 may be an example of data processing system 100 described in Example 1 above, and may include one or more computers configured to receive and process data. Data processing system 302 may be referred to interchangeably as a turbulence data processor. As described above, data processing system 302 may be in communication with other data processing systems, and/or with personal electronic devices 304, 306 via one or more networks such as network 200, 202 described above. Likewise, devices 304, 306 may each be an example of client devices 212 and/or 214.

Personal electronic devices 304 and 306 may include any suitable portable device typically carried onboard an aircraft by a passenger 310 and configured to communicate over a wireless and/or cellular data network and having a motion sensor embedded therein or coupled thereto. For example, personal electronic devices 304 and 306 may include a smartphone, a tablet computer, a wearable computer (e.g., a smart watch or a headset), a personal fitness or health tracking device, a PDA, a laptop computer, an e-reader, and/or the like, or any combination of these. Although two devices are described and shown in FIG. 3, it should be understood that more or fewer devices may be included in system 300. Each of the personal electronic devices may be in the possession of a different passenger 310 onboard the aircraft.

Each personal electronic device 304, 306 may include a respective motion sensor 312, 314 as well as other sensors.

For example, sensor(s) 312 and/or 314 may be an accelerometer, a gyroscope, a magnetometer, and/or the like, or any combination of these. Personal electronic devices 304 and 306 may respectively include one or more antennas 316, 318 configured to receive and/or transmit electromagnetic signals. These antennas may facilitate location-determining capabilities. For example, personal electronic devices 304 and 306 may each include a global positioning system (GPS) antenna, a WiFi antenna, a cellular antenna, a BLUETOOTH® antenna, and/or the like, or any combination of these. These antennas, separately or in combination, may enable determination of geographical position, elevation, and/or proximity to known objects such as wireless beacons, cell towers, satellites, other personal electronic devices, and/or WiFi routers.

Accordingly, each personal electronic device 304, 306 may be configured to automatically sense motion of the device using one or more sensors 312, 314, and may be capable of communicating data corresponding to such sensed motion via one or more antennas 316, 318. Collection and communication of motion-related data, which may include some initial processing, may be carried out or coordinated, and/or controlled by a software application 320, 322, interchangeably referred to as an app, installed on each personal electronic device 304, 306. App 320, 322 may include a standalone application. In some examples, app 320, 322 may be included in the functionality of another application, and/or may include firmware and/or hardware components.

To facilitate communication of motion-related data from personal electronic devices 304 and 306 to data processing system 302, a wireless communication network 324 may be included onboard aircraft 308. Wireless communication network 324 may include any suitable wireless network configured to allow devices 304, 306 of passengers 308 to communicate with the Internet over a wireless protocol such as WiFi. An example of a suitable wireless communication network 324 is the in-flight WiFi network currently provided by GoGo, LLC on many commercial aircraft.

Wireless communication network 324 may include a wireless (e.g., WiFi) router 326 configured to establish the wireless network onboard the aircraft and to send and receive signals. Network 324 may include a dedicated onboard controller 328 configured to process inbound and outbound data and signals. An air-to-ground antenna 330 may be coupled to the aircraft and controller 328, and configured to receive and transmit communications between ground-based antennas 332 (e.g., cell sites or towers) and the aircraft. In some examples, antenna 330 and/or another antenna coupled to the aircraft and controller 328 may be configured to receive and transmit communications between aircraft 308 and satellite or other airborne communication systems. In these examples, the antenna may be referred to as an air-to-air, or air-to-satellite antenna. In some examples, system 300 may include a plurality of aircraft and a plurality of other wireless routers. Each of the other wireless routers may be onboard one of the other aircraft. In these examples, data processing system 302 may be configured to receive motion data from the personal electronic devices onboard the plurality of aircraft.

Wireless communication network 324 may be functionally and/or physically independent of the command and control system of the aircraft and of the aircraft communication system (e.g., systems used for pilot communications and air traffic control). Accordingly, data communicated between personal electronic devices 304, 306 and data processing system 302 may be segregated and separate from standard aircraft-related voice and data communications.

Ground-based antennas 332 may be in communication with ground-based controllers or processors 334, which may be examples of data processing system 100 configured to control and process data being communicated to and from the wireless network onboard the aircraft. A plurality of antennas 332 and processors 334 may be arranged in a ground-based network 336, which in turn may be in communication with a wider network 338, such as the Internet. Data processing system 302 may be in communication with one or both of networks 336 and 338, such that data processing system 302 may be in operative communication with the personal electronic devices 304, 306 onboard aircraft 308. Although a single aircraft 308 is shown and described, having a single wireless network 324, it should be appreciated that a plurality of aircraft and/or communication networks may be included in system 300.

Data may be communicated between network 324 and networks 336, 338 in both directions. As indicated in FIG. 3, first data 340 may be communicated from aircraft 308 to network 336 in a download direction 342. First data 340 may include any suitable data or digital information. First data 340 may be partially or entirely encrypted, such as by controller 328, using typical encryption methods. First data 340 may include information being communicated from personal electronic devices 304 and 306, such as email communications, browser requests, and motion-related sensor data (e.g., communicated from app 320, 322). First data 340 may include other more global information, such as time of day, and/or information relating to the aircraft, such as geographic position and altitude, speed, and local environmental conditions such as temperature and barometric pressure. Some information may be provided, for example, by an informational communication path from aircraft systems to controller 328.

Likewise, second data 344 may be communicated in an upload direction 346, and may include encrypted and/or unencrypted information being communicated to the network and devices onboard aircraft 308. Second data 344 may include, for example, processed turbulence-related information for display on personal electronic devices 304 and 306.

It should be understood that, in certain situations, communication may be impossible or undesirable via network 324 or some other portion of system 300. In these situations, data such as data 340 and/or 344 may be communicated on a delayed basis through a ground-based cellular network. For example, motion related data may be stored on a personal electronic device during flight, and then communicated to data processing system 302 through the normal cellular carrier system after the aircraft lands.

Data processing system 302 may be configured to receive, aggregate, process, and/or analyze the motion data received from one or more personal electronic devices 304, 306 onboard aircraft 308. As described above, each of the personal electronic devices may be in operative communication with wireless network 324 onboard the aircraft, and each of the plurality of personal electronic devices 304, 306 may include a motion sensor 312, 314 configured to sense motion of the respective electronic device. The motion data collected corresponds to sensed motion over time for each device of the plurality of personal electronic devices, and data processing system 302 may be further configured to identify an atmospheric turbulence event by analyzing the motion data received from the electronic devices 304, 306. In some examples, data processing system 302 may be further configured to correlate the motion data with other information, such as a known location (e.g., geographical location, elevation) of aircraft 308.

Example 4

Figure 4:
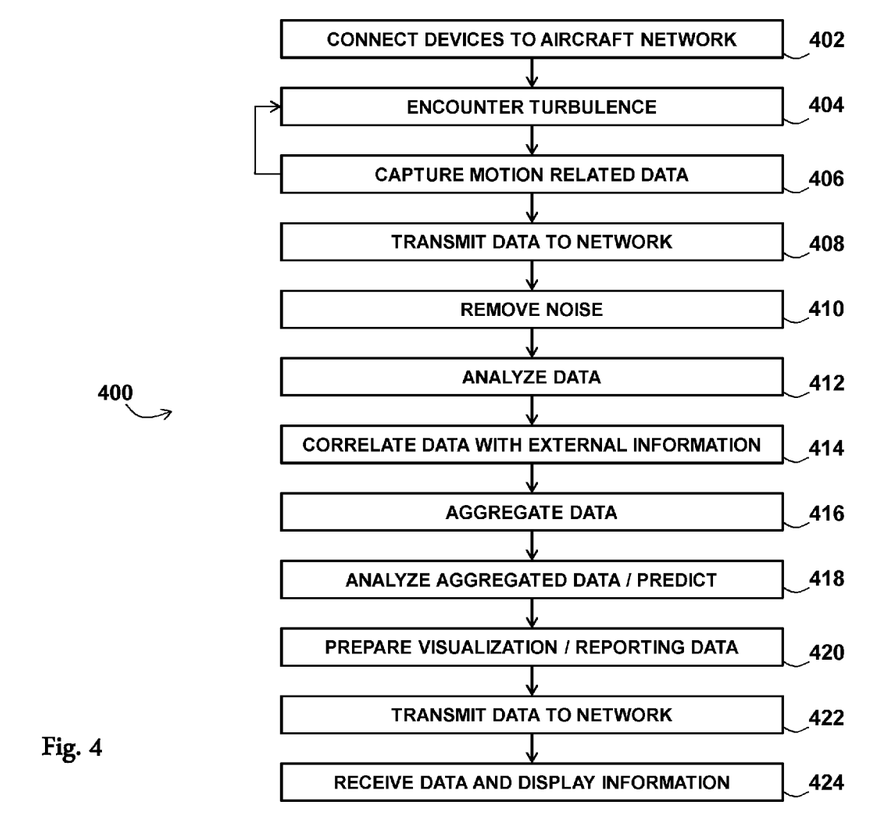
FIG. 4 depicts steps performed in an illustrative method for detecting and monitoring turbulence in accordance with aspects of the present disclosure.

As shown in FIG. 4, this example describes various steps of an illustrative method for detecting, monitoring, and/or analyzing turbulence. Aspects of the data processing systems of Example 1, networks of Example 2, and turbulence detection and monitoring systems of Example 3 may be utilized in the method described below. Where appropriate, reference may be made to previously described components and systems that may be used in carrying out each step. These references are for illustration, and are not intended to limit the possible ways of carrying out any particular step of the method.

FIG. 4 is a flowchart illustrating steps performed in an illustrative method, and may not recite the complete process or all steps of the process. FIG. 4 depicts multiple steps of a method, generally indicated at 400, which may be performed in conjunction with turbulence detection and monitoring system 300 according to aspects of the present disclosure. Although various steps of method 400 are described below and depicted in FIG. 4, the steps need not necessarily all be performed, and in some cases may be performed in a different order than the order shown.

Referring to FIGS. 3 and 4, at step 402, passengers 310 and/or other users (e.g., flight crew) may connect personal electronic devices (e.g., smartphones) 304, 306 to the wireless (e.g., WiFi) network 324 onboard an aircraft, such as aircraft 308. In general, this may be accomplished by logging into the network via specialized software, possibly with a username and password. Multiple devices 304, 306 may be placed into communication with the network and granted access for two-way communications using a wireless protocol such as WiFi and/or BLUETOOTH®. As described in Example 3, the wireless network may include an onboard computer/controller (e.g., controller 328), and may be in communication with a ground-based network via an air-to-ground antenna (e.g., antenna 330). Additionally or alternatively, communication with ground-based networks may be established indirectly via communications with one or more satellites or other aircraft or airborne platforms. This may be appropriate, for example, when the aircraft is flying over a large body of water and ground-based antennas are impractical.

At step 404, aircraft 308 may encounter turbulence while in flight. This may also be referred to as a motion event. When encountering turbulence, an aircraft may move unexpectedly or unpredictably. Movement may be in directions and with forces that are outside the expected range of motion based on aircraft course and speed. Individual passengers may move within the cabin, whether or not the aircraft is experiencing turbulence. However, in a turbulence event, all passengers may experience a similar or at least coincidental displacement.

At step 406, motion-related data is captured by personal electronic devices 304, 306 of the onboard users. For example, accelerometer data may be recorded (e.g., stored in a memory) and/or streamed to an installed application for further processing or transmission. In some examples, data capture may be continuous. In some examples, data capture may be periodic. In some examples, data capture may be conditional, such as only recording information when sensed motion is above a predetermined or selectable threshold. Data capture may be coordinated and/or processed using an installed application (i.e., app), such as app 320, 322 on the respective personal electronic device. This app may be activated by the user and/or automatically, such as upon logging into the aircraft wireless network. In some examples, data captured may be stored for later processing and/or transmission. For example, when a device may not have connectivity at the time of data capture, data may be stored in a persistent memory of the device, and may be stored in any suitable form of data store, such as a data file (e.g., JSON or XML) or a relational database (e.g., SQLite, CouchDB).

At step 408, some or all of the data captured in step 406 is transmitted by the personal electronic devices to the onboard communication network (e.g., network 324) and from there to the ground-based network (e.g., network 336). From the perspective of a receiving network or data processor, this step may be described as receiving motion-related data from a plurality of personal electronic devices onboard an aircraft in flight, each of the personal electronic devices including a respective motion sensor (e.g., accelerometer). Alternatively or additionally, some or all of steps 402-408 may be described as collecting accelerometer data from a plurality of smartphones onboard an aircraft in flight. Motion-related data may be communicated at least in part over a wireless network onboard the aircraft.

Some processing of the data may be performed on the device, by the onboard controller computer, and/or by a ground-based computer. For example, data may be compressed, time stamped, and/or labeled with a device identifier (ID). Synchronization of the data, such as by providing a time stamp from a single reference clock, may facilitate reduction or elimination of errors or discrepancies in clocks on each of the personal electronic devices. Flight information may be added to the data, for example, to identify the originating aircraft. The data is communicated to the ground-based network, to the wider network (e.g., the Internet), and finally to the data processing system that will perform analysis of the aggregated data from all such aircraft and personal electronic devices. This data processing system may include a plurality of networked computers, and may be referred to herein as the turbulence data processor.

In some examples, some or all of the data transmission may be carried out over a ground-based cellular network. For example, if a device is not connected to onboard WiFi, that device may not connect to any network until the aircraft lands and the device connects to a carrier cellular network. At that point, the data captured may be transmitted to the turbulence data processor, as described above. In this example, the onboard wireless network may be bypassed.

At step 410, the motion-related data may be processed to filter out non-turbulence related motion. In other words, step 410 may include filtering motion sensor (e.g., accelerometer) data to identify turbulence events encountered by the aircraft. This filtering may be performed in part on the personal electronic device, the onboard controller computer, and/or the turbulence data processor. For example, filtering may include elimination of data corresponding to motion below a selected threshold. In some examples, filtering may include comparing motion-related data from the plurality of personal electronic devices on the same aircraft to each other and determining motion substantively shared by all devices. As explained above, flight-related information may be provided by the onboard controller as it relays data, facilitating identification of which devices are or were on the same aircraft and flight. In some examples, the flight-related data may be provided by the app installed on the device, by a data store relating device identifiers with flights, by comparing the timestamp and geographic location of the device with known flight routes, and/or any other suitable method. In some examples, filtering may include comparing motion-related data to expected motion of the aircraft, such as known intentional changes in course and speed. This data may be provided by or obtained from other systems onboard the aircraft, airlines, airports, air traffic control systems, and the like.

At step 412, the filtered data from step 410 may be further processed (e.g., by the turbulence data processor). For example, the data may be processed to identify motion events meeting certain criteria. For example, the filtered motion data may indicate that movement of devices onboard an aircraft substantially matched or corresponded to the characteristics of turbulence-caused aircraft motion. In other words, criteria may be established (e.g., a certain threshold amplitude of acceleration) that indicate a turbulence event, and the motion data may be compared to those criteria. In some examples, identifying motion events such as turbulence events may include classifying or categorizing each event encountered. For example, categorization may include determining an intensity of force or stress, an amplitude of acceleration, a frequency of repeated motion, a direction of force, and/or the like, or any combination of these. Steps 410 and/or 412 may be characterized in part as analyzing the motion-related data to determine a motion event common to the plurality of personal electronic devices.

At step 414, data, such as identified motion events, may be correlated with external information, such as the known flight path of the aircraft, weather conditions, location information, and the like, or any combination of these. For example, step 414 may include correlating one or more motion events with a geographical location and altitude of the aircraft. This external information may be provided from one or more sources, such as the originating aircraft, airline systems, meteorology data sources, GPS, air traffic control, etc. Accordingly, identified motion events (e.g., turbulence events) may be placed into a larger context.

At step 416, data across multiple aircraft and flight paths may be aggregated. Data being aggregated may be in any suitable stage of processing. For example, data may be aggregated following the filtering and processing steps described above, such that "turbulence events" are the data points being aggregated.

At step 418, analysis may be performed on and/or using the aggregated data from step 416. In some examples, analysis may be performed as part of the aggregation (e.g., as part of the decision process regarding aggregation rubrics). In some examples, analysis may be performed on already-aggregated data (e.g., mapping of the aggregated data over time). For example, aggregate analysis may include mapping a plurality of motion events to determine atmospheric turbulence in relation to location and altitude along the flight path of an aircraft. For example, motion-related data from multiple aircraft flying on the same route may be aggregated and analyzed to show where turbulence should be expected on that route, and/or to show movement of turbulent air over time. In some examples, motion-related data from multiple aircraft flying on multiple routes may be aggregated and analyzed to show geographical and/or altitudinal distribution of turbulent air.

Analysis may include event identification, event and systemic description, turbulence and other event prediction and forecasting, generation of graphical representations for subjective and objective visual analysis, pattern identification, simulation and modeling, determination of alarms and warnings, and/or the like, or any combination of these. In some examples, analysis may include forecasting of turbulence and/or prediction of movement of air masses.

Step 420 includes preparation of one or more graphical representations and/or reports based on the analysis of step 418. For example, step 420 may include generating a map of the turbulence events based on geographical location and/or altitude. For example, mapping a plurality of motion events in relation to location and altitude along the flight path of an aircraft may generate a visual representation of atmospheric turbulence along that path. Turbulence information may be presented on a geographical map, a 3-D map showing location and altitude, a heat map, a chart, a database, a spreadsheet, and/or the like, or any combination of these. Representations may be provided at various levels of abstraction, from raw data to stylized graphical maps. Representations may show change over time, such as in an animation or series of representations. Representations may be machine-readable and/or human-readable.

Step 422 may include communicating the processed data and/or graphical representation over one or more of the networks. For example, a graphical representation may be communicated by the turbulence data processor over the Internet, where it may be viewed by any suitable connected device, for example, using a web browser. In some examples, processed data and/or graphical representations may be communicated to at least one of the plurality of personal electronic devices onboard an aircraft, such as via the onboard wireless networks.

At step 424, the data and/or graphical representations may be received by the personal electronic devices and presented to users. Step 424 may include causing a visual representation of a map of turbulence information to be displayed on at least one of the personal electronic devices (e.g., smartphones). For example, the data and/or visualization may be accessed using an app installed on the devices. This app may be the same app used to collect and communicate the motion-related data, but could be a different application than the application used to collect and communicate the motion-related data. Accordingly, users may participate in and receive information from the collection of motion-related data. For example, aggregated and processed data may indicate that a certain flight will likely experience turbulence at a known point along its flight path. An alert or warning may be communicated to users of the system. This alert may be separate from and independent of any information communicated to the users/passengers by the flight crew (e.g., a pilot announcement).

In some examples, data and/or graphical representations may be received by other devices and systems. For example, such data and representations may be received by in-airport flight information boards, travel and/or weather related websites, mobile apps, and the like. In some examples, organizations such as the National Oceanic and Atmospheric Administration (NOAA) may receive and/or integrate such information into existing or new models or informational displays. In some examples, airlines and/or airports may receive the data for use in route planning, flight path guidance, air traffic control, and the like.

Example 5

This section describes additional aspects and features of turbulence detection and monitory systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A system for monitoring atmospheric turbulence, the system comprising: a data processing system in operative communication with a wireless network onboard an aircraft; the data processing system being configured to receive motion data from a plurality of personal electronic devices onboard the aircraft, each device of the plurality of personal electronic devices in operative communication with the wireless network onboard the aircraft and each device of the plurality of personal electronic devices including a motion sensor configured to sense motion of the respective electronic device; wherein the motion data corresponds to sensed motion over time for each device of the plurality of personal electronic devices, and wherein the data processing system is further configured to identify an atmospheric turbulence event by analyzing the motion data received from the plurality of electronic devices.

A1. The system of A0, wherein the data processing system is further configured to correlate the motion data with location information corresponding to a location (e.g., geographical location) and/or an altitude of the aircraft.

A2. The system of any of paragraphs A0-A1, further including the plurality of personal electronic devices in operative communication with the wireless network onboard the aircraft.

A3. The system of any of paragraphs A0-A2, wherein each of the personal electronic devices is in the possession of a different passenger onboard the aircraft.

A4. The system of any of paragraphs A0-A3, further including a wireless router onboard the aircraft, the router configured to establish a wireless network onboard the aircraft.

A5. The system of any of paragraphs A0-A4, further including the aircraft.

A6. The system of any of paragraphs A0-A5, further including a plurality of other wireless routers, each of the other wireless routers being onboard one of a plurality of other aircraft, the data processing system being further configured to receive motion data from personal electronic devices onboard the plurality of other aircraft.

B0. A method for monitoring air turbulence, the method comprising: receiving motion-related data from a plurality of personal electronic devices onboard an aircraft in flight, each of the personal electronic devices including a respective motion sensor; analyzing the motion-related data to determine a motion event common to the plurality of personal electronic devices; and correlating the motion event with a location (e.g., geographical location and/or altitude) of the aircraft.

B1. The method of B0, further comprising determining an occurrence of an atmospheric turbulence event based on the correlation.

B2. The method of any of paragraphs B0-B1, further including mapping a plurality of the motion events to generate a visual representation of atmospheric turbulence in relation to location and altitude along the flight path of the aircraft.

B3. The method of any of paragraphs B0-B2, further including analyzing motion-related data and mapping the motion events for a plurality of aircraft on a plurality of respective flight paths.

B4. The method of any of paragraphs B1-B3, further including communicating the visual representation of the plurality of motion events to at least one of the plurality of personal electronic devices.

B5. The method of any of paragraphs B0-B4, wherein receiving motion-related data includes receiving data from at least one accelerometer disposed in one of the plurality of personal electronic devices.

B6. The method of any of paragraphs B0-B5, wherein receiving motion-related data includes receiving data communicated at least in part over a wireless network onboard the aircraft.

B7. The method of any of paragraphs B0-B6, wherein analyzing the motion-related data to determine a motion event includes determining an amplitude of an acceleration encountered.

B8. The method of any of paragraphs B0-B7, wherein analyzing the motion-related data includes comparing the motion-related data to expected motion of the aircraft.

B9. The method of any of paragraphs B0-B8, wherein analyzing the motion-related data includes comparing the motion related data of the plurality of personal electronic devices to each other.

B10. The method of any of paragraphs B0-B9, further including categorizing the motion event based on amplitude and frequency of motion.

B11. The method of any of paragraphs B0-B10, wherein at least one of the personal electronic devices is a smartphone.

C0. A method for monitoring turbulence, the method comprising: collecting accelerometer data from a plurality of smartdevices onboard an aircraft in flight; filtering the accelerometer data to identify turbulence events encountered by the aircraft; generating a map of the turbulence events based on location (e.g., geographical location and/or altitude).

C1. The method of C0, further including communicating the map of turbulence events to at least one of the smartdevices.

C2. The method of C1, further including causing a visual representation of the map to be displayed on the at least one of the smartdevices.

C3. The method of any of paragraphs C0-C2, wherein collecting accelerometer data includes receiving data communicated at least in part through a wireless network onboard the aircraft.

C4. The method of any of paragraphs C0-C3, wherein the collecting and filtering steps are performed with respect to a plurality of aircraft in flight, and the generating step includes turbulence events for the plurality of aircraft.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A system for monitoring atmospheric turbulence, the system comprising:
a data processing system in operative communication with a wireless network onboard an aircraft, the data processing system being configured to receive motion data from a plurality of personal electronic devices onboard the aircraft, each device of the plurality of personal electronic devices being in the possession of a different passenger onboard the aircraft and in operative communication with the wireless network onboard the aircraft and each device of the plurality of personal electronic devices including a motion sensor configured to sense motion of the respective electronic device;
wherein the motion data corresponds to sensed motion over time for each device of the plurality of personal electronic devices, and
wherein the data processing system is further configured to identify an atmospheric turbulence event by analyzing a location of the aircraft and the motion data received from the plurality of electronic devices, including comparing the motion data from the plurality of personal electronic devices onboard the aircraft and filtering the motion data for motion shared by all of the plurality of personal electronic devices such that other motion data is filtered out.

2. The system of claim 1, further including the plurality of personal electronic devices in operative communication with the wireless network onboard the aircraft.

3. The system of claim 1, further including a wireless router onboard the aircraft, the router being configured to establish the wireless network onboard the aircraft.

4. The system of claim 3, further including a plurality of other wireless routers, each of the other wireless routers being onboard one of a plurality of other aircraft, the data processing system being further configured to receive motion data from personal electronic devices onboard the plurality of other aircraft.

5. A method for monitoring air turbulence, the method comprising:
receiving motion-related data from a plurality of personal electronic devices onboard an aircraft in flight, each of the personal electronic devices in the possession of a different passenger onboard the aircraft and including a respective motion sensor, wherein the motion-related data corresponds to sensed motion over time for each device of the plurality of personal electronic devices;
analyzing the motion-related data to determine a motion event common to the plurality of personal electronic devices, and to filter out other motion-related data;
correlating the motion event with a location of the aircraft; and
determining an occurrence of an atmospheric turbulence event based on the correlation.

6. The method of claim 5, further including mapping a plurality of the motion events to generate a visual representation of atmospheric turbulence in relation to location along the flight path of the aircraft.

7. The method of claim 6, further including analyzing motion-related data and mapping the motion events for a plurality of aircraft on a plurality of respective flight paths.

8. The method of claim 5, wherein receiving motion-related data includes receiving data from at least one accelerometer disposed in one of the plurality of personal electronic devices.

9. The method of claim 5, wherein receiving motion-related data includes receiving data communicated at least in part over a wireless network onboard the aircraft.

10. The method of claim 5, wherein analyzing the motion-related data to determine a motion event includes determining an amplitude of an acceleration encountered.

11. The method of claim 5, wherein analyzing the motion-related data includes comparing the motion-related data to expected motion of the aircraft.

12. The method of claim 5, wherein analyzing the motion-related data includes comparing the motion related data of the plurality of personal electronic devices to each other.

13. A method for monitoring turbulence, the method comprising:
collecting motion-related data from a plurality of smartdevices onboard an aircraft in flight, each of the smartdevices being in the possession of a different passenger onboard the aircraft;
filtering the motion-related data to identify turbulence events encountered by the aircraft, the filtering including comparing the motion-related data from the plurality of smartdevices onboard the aircraft and filtering the motion-related data to include only motion shared by all of the smartdevices such that other motion-related data is filtered out;
correlating each of the turbulence events with a respective geographic location of the aircraft; and
generating a map of the turbulence events based on the geographical locations.

14. The method of claim 13, further including communicating the map of turbulence events to at least one of the smartdevices.

15. The method of claim 14, further including causing a visual representation of the map to be displayed on the at least one of the smartdevices.

16. The method of claim 13, wherein collecting motion-related data includes receiving data communicated at least in part through a wireless network onboard the aircraft.

17. The method of claim 13, wherein the collecting and filtering steps are performed with respect to a plurality of aircraft in flight, and the generating step includes turbulence events for the plurality of aircraft.

* * * * *